(12) United States Patent
Sugaya

(10) Patent No.: US 9,690,167 B2
(45) Date of Patent: Jun. 27, 2017

(54) IMAGE SHAKE CORRECTING DEVICE AND CONTROL METHOD THEREFOR, LENS BARREL, OPTICAL APPARATUS, AND IMAGE PICKUP APPARATUS

(71) Applicant: CANON KABUSHIKI KAISHA, Tokyo (JP)

(72) Inventor: Tomohiro Sugaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 14/518,562

(22) Filed: Oct. 20, 2014

(65) Prior Publication Data

US 2016/0112618 A1    Apr. 21, 2016
US 2017/0013180 A9    Jan. 12, 2017

(30) Foreign Application Priority Data

Oct. 21, 2013  (JP) ................................. 2013-218231

(51) Int. Cl.
*G03B 5/00*        (2006.01)
*H04N 5/232*       (2006.01)

(52) U.S. Cl.
CPC ............ *G03B 5/00* (2013.01); *H04N 5/2327* (2013.01); *H04N 5/2328* (2013.01); *H04N 5/23258* (2013.01); *H04N 5/23287* (2013.01); *H04N 5/23293* (2013.01); *G03B 2205/0007* (2013.01); *G03B 2217/005* (2013.01)

(58) Field of Classification Search
None
See application file for complete search history.

(56) References Cited

U.S. PATENT DOCUMENTS 5,845,156 A * 12/1998 Onuki .................. G02B 27/646
                                                    348/208.11
2015/0097977 A1* 4/2015 Watanabe .......... H04N 5/23258
                                                     348/208.2

FOREIGN PATENT DOCUMENTS

JP          07-104338 A       4/1995

* cited by examiner

*Primary Examiner* — W B Perkey
(74) *Attorney, Agent, or Firm* — Cowan, Liebowitz & Latman, P.C.

(57) ABSTRACT

An angular velocity sensor detects a shake of an image pickup apparatus and a signal divide unit divides a shake detection signal to output it to each of a first drive amount calculating unit and a second drive amount calculating unit. A first drive amount and a second drive amount are calculated based on the divided shake detection signal to drive each of a first correction lens and a second correction lens. An aberration determination unit changes a limiter used in a drive amount limiting unit based on the first drive amount and the second drive amount so as not to increase the eccentric aberration of an imaging optical system generated by the movement of the two correction lenses. The drive amount limiting unit limits the drive amount based on the limiter set according to the result of the determination for the aberration to correct the image shake while suppressing the eccentric aberration.

14 Claims, 7 Drawing Sheets

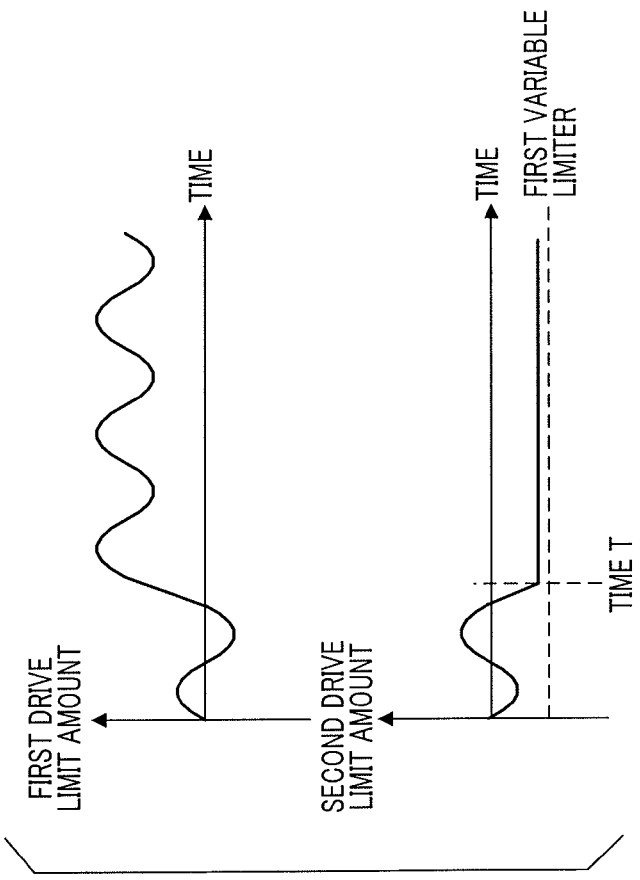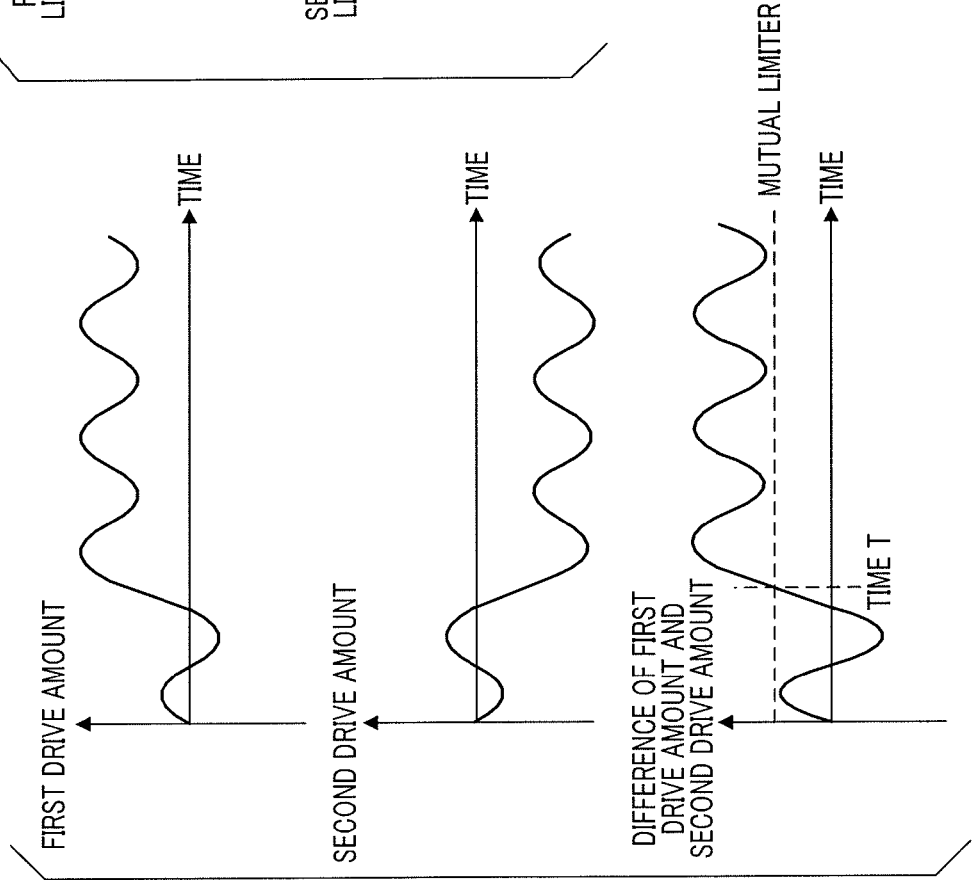

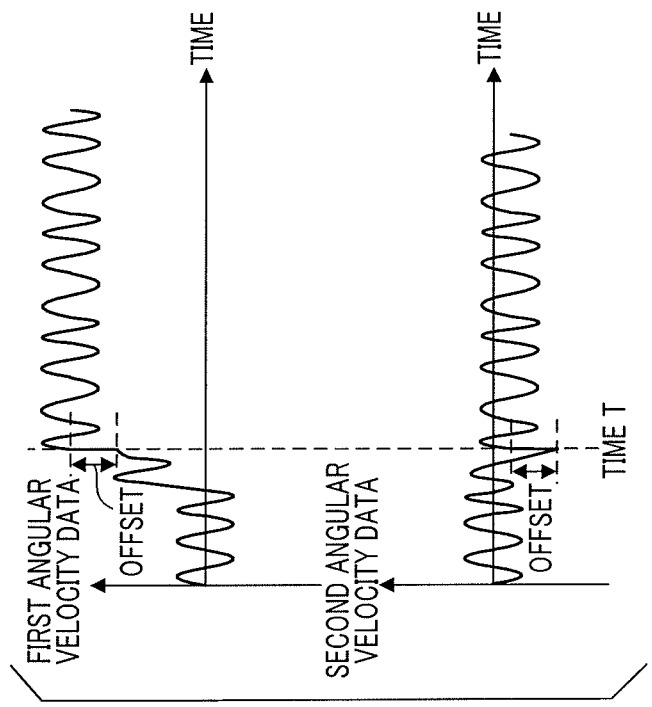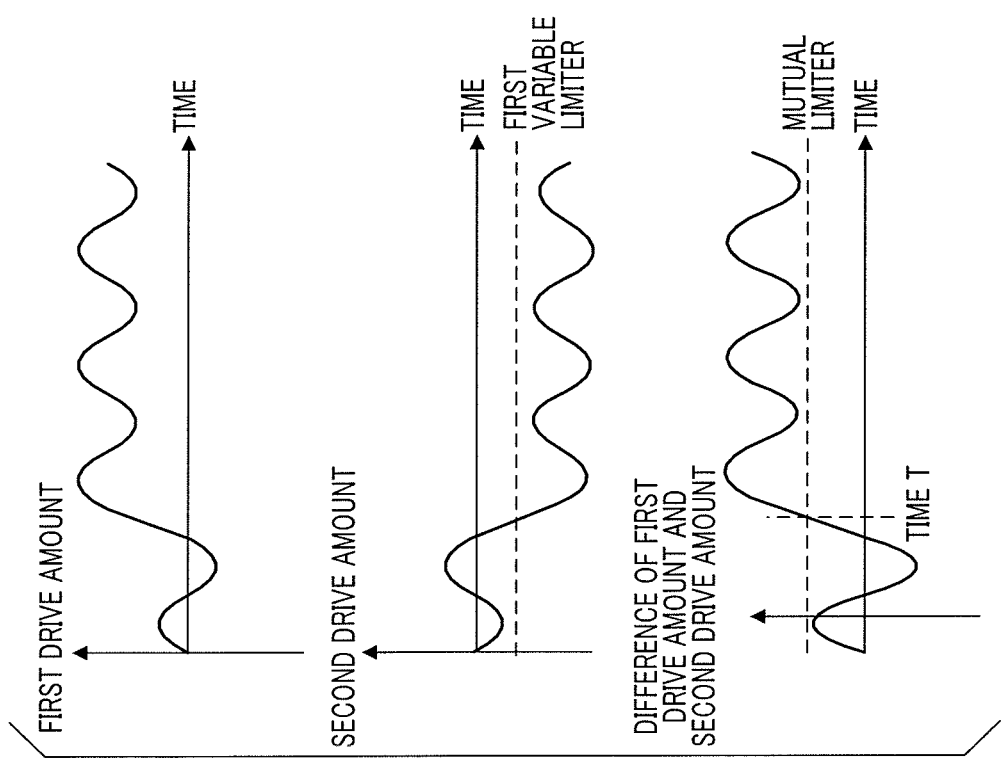

IMAGE SHAKE CORRECTING DEVICE AND CONTROL METHOD THEREFOR, LENS BARREL, OPTICAL APPARATUS, AND IMAGE PICKUP APPARATUS

BACKGROUND OF THE INVENTION

Field of the Invention

The present invention relates to a technique for correcting image shake by a plurality of correction optical systems.

Description of the Related Art

In recent years, with the rise of a technique for an image shake correction of an image pickup apparatus, a function has become popular that corrects a large image shake occurs when a photographer captures an image while walking as well as the image shake due to a hand shake or the like occurs when the photographer captures an image while standing still. There has been proposed a correcting unit configured to use two correction optical systems to realize the image shake correction. There has been a configuration for expanding a correction range by the cooperative effect of two correction optical systems, and a device for correction in a wide frequency band as a weight saving correction optical system in which one correction optical system corrects a large shake at a low frequency band and the other corrects a small shake at a high frequency band.

Japanese Patent Laid-Open No. H7-104338 discloses a technique for coordinating the driving of a shake correcting unit of a lens-shift mode and a rear converter with a function of an image shake correction in an interchangeable lens of a single-lens reflex mode camera when the both of those are used. If a shake amount of the image pickup apparatus exceeds the correction limit amount in one correction optical system, the other correction optical system can be driven for the excess shake to realize a larger correction angle.

The conventional device may not consider the reduction in optical performance due to driving the two correction optical systems. The large correction angle can be obtained by offsetting the two correction optical systems respectively to tilt the optical axis. However, on the other hand, the amount of eccentric aberration for the imaging optical system becomes larger relative to the case when offsetting a single correction optical system. Therefore, the quality of the appearance of the captured image may be affected by the large amount of the eccentric aberration.

SUMMARY OF THE INVENTION

The present invention provides an image shake correcting device for correcting image shake by using a plurality of correcting units to obtain the excellent effect of the image shake correction while suppressing eccentric aberration of an imaging optical system.

According to an aspect of the present invention, an image shake correcting device for correcting an image shake by using a plurality of optical correcting units to be components of an imaging optical system is provided that includes: a signal dividing unit configured to divide the shake detection signal by a shake detecting unit into a plurality of signals; a calculating unit configured to calculate respectively a drive amount of the plurality of the optical correcting units from the plurality of the signals divided by the signal dividing unit; and a limiting unit configured to limit the drive amounts of the plurality of the optical correcting units. When the plurality of the optical correcting units are driven to perform the image shake correction, the limiting unit limits any drive of the plurality of the optical correcting units if eccentric aberration of the imaging optical system is equal to or more than a threshold.

Further features of the present invention will become apparent from the following description of exemplary embodiments (with reference to the attached drawings).

BRIEF DESCRIPTION OF THE DRAWINGS

FIGS. 3A and 3B illustrate a drive amount and a limiter when limiting the drive amount according to a first embodiment of the present invention.

FIGS. 6A and 6B illustrate a drive amount, a limiter, and an angular velocity data in limiting the drive amount according to a second embodiment of the present invention.

DESCRIPTION OF THE EMBODIMENTS

Hereinafter, preferred embodiments of the present invention will be described with reference to the drawings. The present invention can be applied to an interchangeable lens mounted on a digital single-lens reflex camera, an optical apparatus such as a lens barrel, an image pickup apparatus such as a digital video camera, a monitoring camera, a Web camera, or the like, and electronic equipment including an image pickup apparatus, such as a mobile phone, a tablet terminal, or the like. Note that "a shake" is defined as vibration applied to the image pickup apparatus and "an image shake" is defined as a positional shift of an object image or a blur of the object image between the frames of the photographing images generated by the shake applied to the image pickup apparatus as described in an embodiment of the present invention. Therefore, the image shake may occur when the image shake correction by using a correction optical system is not performed. In addition, the image shake can be corrected by the control of the correction optical system.

First Embodiment

Figure 1:
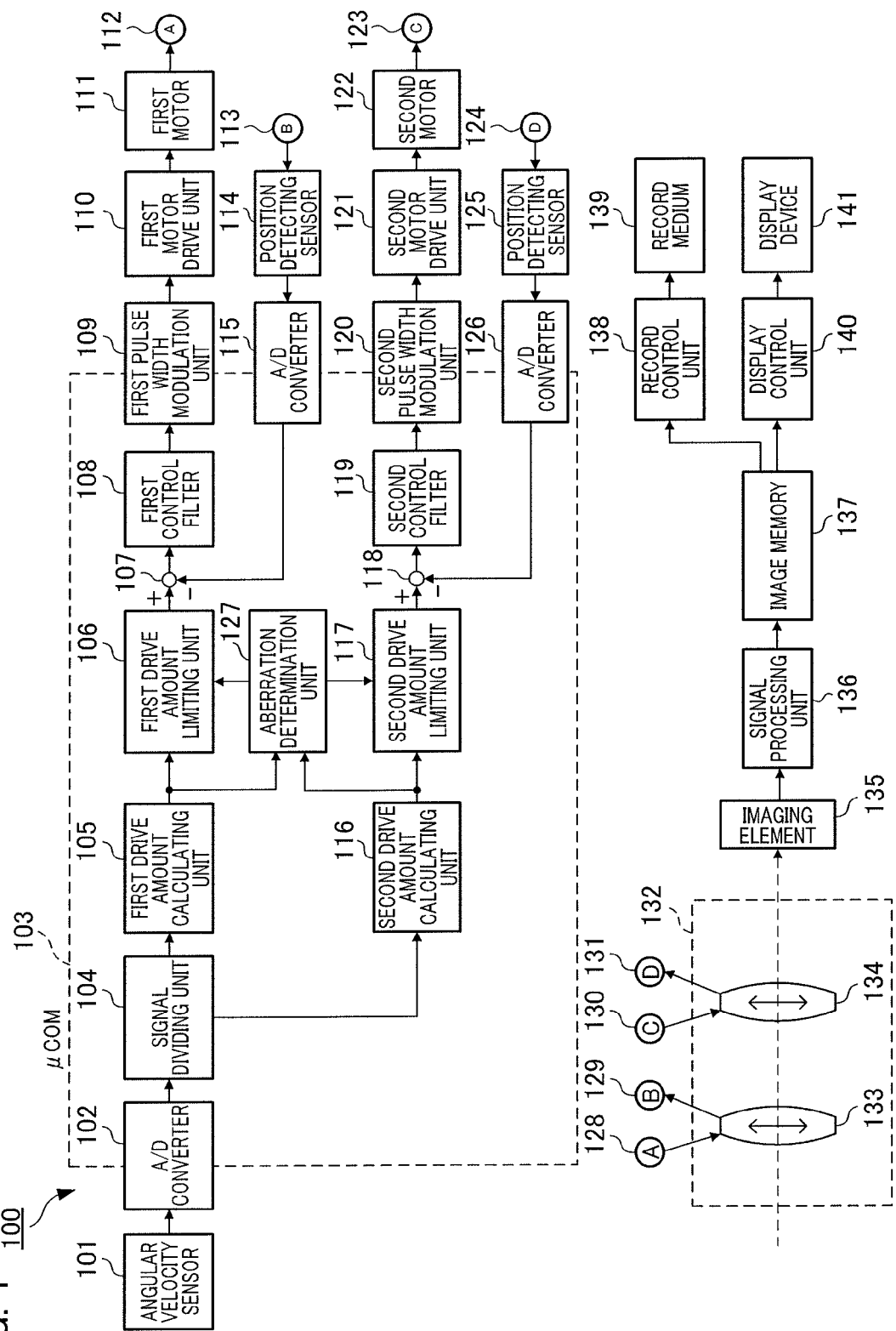
FIG. 1 is a block diagram illustrating an exemplary configuration of an image pickup apparatus according to a first embodiment of the present invention.

FIG. 1 is a block diagram illustrating a configuration of a video camera as an example of an image pickup apparatus 100 according to a first embodiment of the present invention. The image pickup apparatus 100 comprises a first correction optical system 133 and a second correction optical system 134, which constitute an imaging optical system 132. The first correction optical system 133 comprises a first correction lens and the second correction optical system 134 comprises a second correction lens. Each correction lens can be driven based on the shake of the image pickup apparatus 100 to correct the larger image shake.

An imaging element 135 converts photoelectrically an optical image focused by the imaging optical system 132 to output an image signal e representing a photographing image consisting of a plurality of pixels to a signal processing unit 136. The signal processing unit 136 performs signal processing such as gain adjustment, color balance adjustment, and gamma correction to the image signal output from the imaging element 135. The image signal is converted into a video signal (video signal) based on NTSC format or the like to be stored in an image memory 137. A record control unit 138 reads the video signal from the image memory 137 to convert it into the form for recording in a record medium 139 if the recording of the video signal is instructed by an operation unit (not shown). The operation unit is used when the processing of the recording is begun or stopped. The record medium 139 is a magnetic recording medium such as a hard disc or an information recording medium of a semiconductor memory or the like. A display control unit 140 outputs the video signal processed depending on the use, such as the image based on the video signal output from the image memory 137 (through image) or, the setting menu image, the recorded image or the like to display the image in a display device 141. The display device 141 is a liquid crystal display element (LCD) or the like, and displays the image generated by the display control unit 140.

Next, a description will be given of an image shake correction optical system and a control unit. An angular velocity sensor 101 is a shake detecting unit of the image pickup apparatus 100 configured to output an angular velocity signal as a shake detection signal. For example, the angular velocity sensor is arranged in yaw rotation axis direction that is horizontal direction and in pitch rotation axis direction that is vertical direction respectively to make the detection axes perpendicular to each other in a plane perpendicular to the optical axis of the imaging optical system 132. Then, the processing for calculating the correction amount for the each detected axis is performed to control the drive of the first correction lens and the second correction lens. The calculation of the correction amount for the yaw rotation axis and the pitch rotation axis, and except the difference of the direction, the control of the correction optical system can be realized by the same processing. Therefore, a description will be given for one axis as following.

The angular velocity signal by the angular velocity sensor 101 is digitized by an A/D converter 102 and output to a signal divide unit 104 inside the control unit (μCOM) 103. The CPU (central processing unit) is used in the control unit 103 and its functional blocks are illustrated in FIG. 1. The CPU reads a control program from the memory for the processing such that these blocks are realized. As following, the angular velocity signal digitized by the A/D converter 102 is called "angular velocity data".

The signal divide unit 104 divides the angular velocity data to generate first angular velocity data for performing the image shake correction by the first correction lens and second angular velocity data for performing the image shake correction by the second correction lens. Note that the signal divide unit 104 separates the first angular velocity data from the second angular velocity data as mutually complementary signals to correct the shake detected by the angular velocity sensor 101 with high accuracy by using a plurality of correction optical systems (two systems in the embodiment). For example, the signal divide unit 104 amplifies the angular velocity data at the predetermined magnification K1 to output the first angular velocity data and amplifies the angular velocity data at the predetermined magnification K2 to output the second angular velocity data. The predetermined magnifications K1 and K2 are as follow:

$$0 \leq K1 \leq 1$$

$$K2 = 1 - K1 \qquad \text{(Formula 1)}$$

The above magnification can be set to correct the image shake with high accuracy even if the two correction lenses are used. Note that the magnification $K_n$ satisfies "$0 \leq K_n \leq 1$" and "$\Sigma K_n = 1$" (wherein it is $1 \leq n \leq N$ and $\Sigma$ denotes the sum of n) if the N correction lenses are used.

Also, in another embodiment, the signal divide unit 104 comprises a LPF (low pass filter). The angular velocity data output by the A/D converter 102 is passed through the LPF and then, the passed data becomes the first angular velocity data. The second angular velocity data is calculated by subtracting the first angular velocity data from the angular velocity data. Thus, the signal divide unit 104 may have a configuration to perform the frequency divide processing.

A first drive amount calculating unit 105 is for example, an integrator, and obtains the first angular velocity data output by the signal divide unit 104 to calculate a first drive amount based on the data. The first drive amount is a drive amount for driving the first correction lens and is output to a first drive amount limiting unit 106. The first drive amount limiting unit 106 puts a limitation on the first drive amount to control the first correction lens not to abut the end of the movable range if the eccentric aberration of the imaging optical system 132 is equal to or more than the threshold. In one embodiment, the value for limiting the output from the first drive amount calculating unit 105 is output as a final drive amount (hereinafter referred to as "a first drive limit amount") such that the first drive amount does not exceed the predetermined value (hereinafter referred to as a "limiter"). Also, the drive amount limiting unit 106 allows the integration time constant of the first drive amount calculating unit 105 to be short to control the first drive limit amount so as to be reduced with the elapse of time if the output of the first drive amount calculating unit 105 gets closer to the limiter. Also, the first drive amount limiting unit 106 changes the limiter value depending on the output of an aberration determination unit 127.

Next, a description will be given of an element for performing a drive control of the first correction lens.

A subtracter 107 subtracts lens position data as described below from the output of the first drive amount limiting unit 106. The result of the subtraction is output to a first control filter 108 as deviation data. The first control filter 108 comprises an amplifier for amplifying input data at the predetermined gain and a phase compensating filter. The first control filter 108 performs the signal processing by the amplifier and the phase compensating filter to the deviation data supplied from the subtracter 107 and outputs the processed signal to a first pulse width modulation unit 109.

The first pulse width modulation unit 109 modulates the signal to a PWM waveform which alters the duty ratio of the pulse wave based on the data input from first control filter 108 and supplies it to a first motor drive unit 110. A first motor 111 is a voice coil-type motor for driving the first correction lens. The first motor drive unit 110 drives the first motor 111 to move the first correction lens in a direction perpendicular to the optical axis. It is shown in the figures that each of a terminal A 112 and a terminal A 128, and a terminal B 112 and a terminal B 129, is connected electrically.

A position detecting sensor 114 comprises a magnet and a Hall element provided in a position facing thereto. The position detecting sensor 114 detects a movement amount when the first correction lens moves in a direction perpendicular to the optical axis to output the detected signal to an A/D converter 115. The A/D converter 115 converts the detection signal into the lens position data that is a digital data, and outputs it to the subtracter 107. Thereby, a feedback control system is configured to move the first correction lens in a direction perpendicular to the optical axis in response to the output of the first drive amount limiting unit 106.

Next, a description will be given of an element for performing drive control of the second correction lens. Note that the description is brief because its basic element is the same as that of a circuit unit for performing the drive control of the first correction lens.

A second drive amount calculating unit 116 obtains a second angular velocity data output by the signal divide unit 104 to calculate a second drive amount for driving the second correction lens based on the data, and outputs it to a second drive amount limiting unit 117. The second drive amount limiting unit 117 puts a limitation on the second drive amount if the eccentric aberration of the imaging optical system 132 is equal to or more than the threshold. The second drive amount limiting unit 117 puts a limitation on the second drive amount calculated by the second drive amount calculating unit 116 and outputs a second limit drive amount such that the second correction lens does not abut the mechanically movable end.

A subtracter 118 outputs the deviation data, which is obtained by subtracting the lens position data output by an A/D converter 126 from the output of the second drive amount limiting unit 117, to a second control filter 119. The second control filter 119 performs a signal processing by the amplifier and the phase compensating filter on the deviation data input from the subtracter 118, and outputs the processed signal to a second pulse width modulation unit 120.

The second pulse width modulation unit 120 modulates the signal to the PWM waveform which alters the duty ratio of the pulse wave based on the data input from the second control filter 119, and outputs it to a second motor drive unit 121. A second motor 122 is a voice coil-type motor for driving the second correction lens. The second motor drive unit 121 drives the second motor 122 to move the second correction lens in a direction perpendicular to the optical axis. It is shown in the figures that each of a terminal C 123 and a terminal C 130, and a terminal D 124 and a terminal D 131 is connected electrically.

A position detecting sensor 125 comprises a magnet and a Hall element provided at a position facing thereto, and detects a movement amount in a direction perpendicular to the optical axis of the second correction lens, and outputs the detection signal to the A/D converter 126. The A/D converter 126 converts the detection signal of the position detecting sensor 125 into the lens position data and outputs it to the subtracter 118. Thereby, a feedback control system is configured to move the second correction lens in a direction perpendicular to the optical axis of the second correction lens to the output of the second drive amount calculating unit 116.

The first correction lens and the second correction lens for constituting the image shake correction optical system (optical correcting unit) are, for example, shift lenses, and have a role in offsetting the optical axis by moving these lenses in a plane perpendicular to the optical axis. The movement of the first correction lens and the second correction lens corrects the image shake generated by the shake of the image pickup apparatus 100 in longitudinal direction and crosswise direction of the object image on the imaging plane to provide the object image in which the image shake has been corrected in the imaging element 135. A limiting unit composed of the first drive amount limiting unit 106 and the second drive amount limiting unit 117 limits the first drive amount or the second drive amount, or the first drive amount and the second drive amount according to the result of the determination of the aberration to perform the control to reduce the eccentric aberration of the imaging optical system 132 less than the threshold.

Next, a description will be given of a processing from the storage to the display of the photographed image.

The imaging element 135 photoelectrically converts the optical image formed by the imaging optical system 132 comprising the first correction lens and the second correction lens. The signal processing unit 136 performs the predetermined signal processing on the image signal representing the photographing image consisting of a plurality of pixels. The signal converted into the video signal is stored in the image memory 137. The record control unit 138 converts the video signal obtained from the image memory 137 into a style suitable for recording to the record medium 139, and records it to the record medium 139. The display control unit 140 outputs the video signal obtained from the image memory 137. The display device 141 displays the image generated by the display control unit 140.

The aberration determination unit 127 obtains each output of the first drive amount calculating unit 105 and the second drive amount calculating unit 116 to determine the amplitude for the eccentric aberration of the imaging optical system 132 based on the first drive amount and the second drive amount. The aberration determining unit 127 outputs the result of the determination to the first drive amount limiting unit 106 or the second drive amount limiting unit 117. The first drive amount limiting unit 106 or the second drive amount limiting unit 117 performs limit processing on the first drive amount or the second drive amount by using the limit value determined based on the result of the determination of the aberration determination unit 127. Note that the aberration determining unit 127 holds the limiter calculated previously as the data (limiter data) to determine the appropriate limiter in the limiter data based on the first drive amount and the second drive amount. The first drive amount limiting unit 106 or the second drive amount limiting unit 117 limits the first drive amount or the second drive amount according to the determined limiter. Here, with respect to the limiter data, a previous simulation is performed from the positional relationship of the correction lens between the first correction optical system 133 and the second correction optical system 134 to carry out the processing to determine the eccentric aberration acceptable to the individual product from the eccentric aberration of the imaging optical system 132. The value that the positional relationship of the lens is converted into the unit of the drive amount is set as the limiter data not to exceed this eccentric aberration.

Figure 2A:
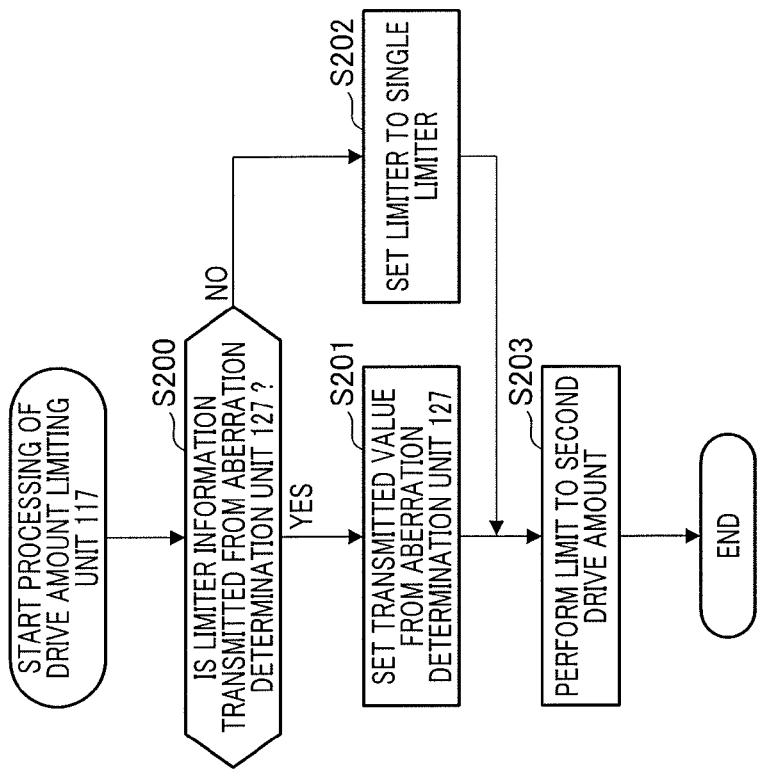
FIGS. 2A and 2B are flow charts illustrating a processing of an aberration determining unit 127 (A) and a processing of a drive amount limiting unit 117 (B) according to a first embodiment of the present invention.

Hereinafter, a description will be given of an exemplary processing of the aberration determining unit 127 and the second drive amount limiting unit 117 referring to a flowchart of FIG. 2, and FIG. 3. FIG. 2A illustrates an exemplary processing performed by the aberration determining unit 127 and FIG. 2 (B) illustrates an exemplary processing performed by the drive amount limiting unit 117.

Firstly, in FIG. 2A, the aberration determining unit 127 starts the processing to read the limiter data of the individual product recorded previously in the memory (not shown).

The limiter comprises a single limiter, a mutual limiter, a first variable limiter, a second variable limiter, and the value of each limiter stands for a limit value. Each limiter is described as below.

S101 is a determination processing whether the difference of the first drive amount and the second drive amount is larger than the mutual limiter or not. If the difference of the first drive amount and the second drive amount is larger than the mutual limiter, the processing proceeds to S102, but if the difference is equal to or less than the mutual limiter, the processing is stopped. Note that the mutual limiter is a limiter provided to prevent the difference of the first drive amount and the second drive amount from increasing so as not to increase the aberration. S102 is a determination processing whether the second drive amount is larger than the first variable limiter or not. In the determination processing in S101, if the difference between the first drive amount and the second drive amount exceeds the mutual limiter, the determination whether the factor is due to the large amount of the second drive amount or not is performed. In an embodiment of the present invention, if the difference between the first drive amount and the second drive amount is large, the amplitude of the second drive amount is further examined to carry out the processing to determine the limiter to the second drive amount. If the second drive amount is larger than the first variable limiter in S102, the processing proceeds to S103 and also, if the second drive amount is equal to or less than the first variable limiter, the processing proceeds to S104. In S103, the value of the first variable limiter is assigned to the limiter. Also, the value of the second variable limiter is assigned to the limiter in S104. In this case, the relationship of "the first variable limiter>the second variable limiter" is practical in the limit value.

When the processing of the S103 or the S104 is stopped, it proceeds to S105 and the aberration determination unit 127 transmits the information about the limiter determined by the processing to the second drive amount limiting unit 117 to stop the processing.

Figure 2B:
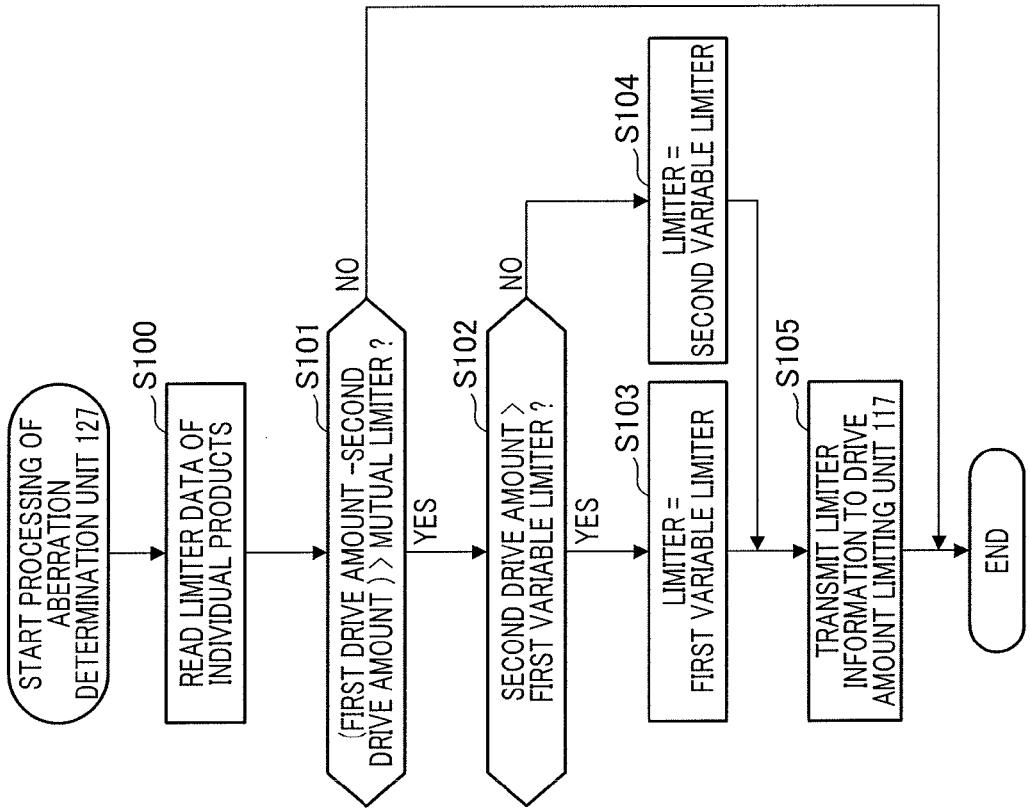

Next, a description will be given of a processing of the drive amount limiting unit 117 referring to FIG. 2B.

The second drive amount limiting unit 117 determines whether the limiter change is transmitted from the aberration determination unit 127 in S200 or not. The transmission of the limiter change is a transmission for providing notification that the aberration determination unit 127 has changed the limiter to the second drive amount limiting unit 117. If the limiter change is transmitted, the processing proceeds to S201, but if the limiter change is not transmitted, it is transferred to S202. In S201, the processing is carried out in which the value transmitted from the aberration determination unit 127 is set as the limiter. Also, in S202, the processing is carried out in which the limiter is set to be the single limiter. The single limiter is a limiter designed for every focusing length based on the mechanically movable end or the optical performance such as the light amount of the second correction lens. It is understood that the second drive amount limiting unit 117 uses the single limiter as the initial value of the limiter.

After S201 or S202, the processing proceeds to S203 and the limiter processing to the second drive amount is performed by using the currently set limiter to then stop the processing.

FIG. 3 illustrates the time variation of each of the first drive amount and the second drive amount, and the first drive limit amount and the second drive limit amount if the above processing is performed. FIG. 3A illustrates a drive amount before the limit and FIG. 3B illustrates a drive amount after the limit. The abscissa shows a time, and the ordinate shows each drive amount or the difference between the drive amounts, which shows the respective amplitudes of the signals.

In FIG. 3A, the difference between the first drive amount and the second drive amount exceeds the level of the mutual limiter when the time is T. At this time, the second drive amount limiting unit 117 performs the limit processing on the second drive amount with the first variable limiter. Note that the limit processing is performed with the second variable limiter if the second drive amount is equal to or less than the first variable limiter as described above.

The processing described above is applied if the first correction lens and the second correction lens are moved so as to be spaced away each other to cause the optical performance of the eccentric aberration of the imaging optical system 132 to increase. In other words, the difference between the first drive amount and the second drive amount is controlled so as to be less than a first threshold equivalent to the set value of the mutual limiter. In contrast, if the movement direction of the first correction lens is same as that of the second correction lens to cause the optical performance of the eccentric aberration of the imaging optical system 132 to increase, the following processing is performed. The processing equivalent to S101 in FIG. 2A determines whether or not the sum of the first drive amount and the second drive amount is less than the mutual limiter in order to control the positional difference of the first correction lens and the second correction lens so as to be equal to or more than the predetermined value (second threshold). If the sum of the first drive amount and the second drive amount is less than the mutual limiter, the processing for setting the limiter is performed such that the sum of the first drive amount and the second drive amount is not less than the predetermined value based on the result of the determination.

In the first embodiment, the variable limiter set based on each of the drive amounts is used in addition to the limiter depending on the property of the individual correction lens. Thereby, when a plurality of correction optical systems is used to correct the image shake, the effect of the image shake correction can be improved while suppressing the eccentric aberration of the imaging optical system.

Note that although the angular velocity sensor 101 is used for the shake detection of the image pickup apparatus in an embodiment of the present invention, an acceleration sensor or the like may be used. Also, the drive control of the shift lens (optical element) is described as the optical image shake correcting unit, but it is not intended as a limitation, and a variety of the image shake correcting units can be used. For example, the image shake correcting units comprise an element for using a prism as the optical element and an element for the variable control of the refraction index of the lens filled with liquid, and the like. Also, when the limiter of the second drive amount limiting unit 117 is changed, the limiter of the first drive amount limiting unit 106 can be changed at the same time. Examples of the data style of the limiter include the form that the limiter data depending on the information such as the focusing length and the aperture value is held in the memory as the multidimensional table data. The variety of the variations described above is similar to those in the following embodiments.

Second Embodiment

Figure 4:
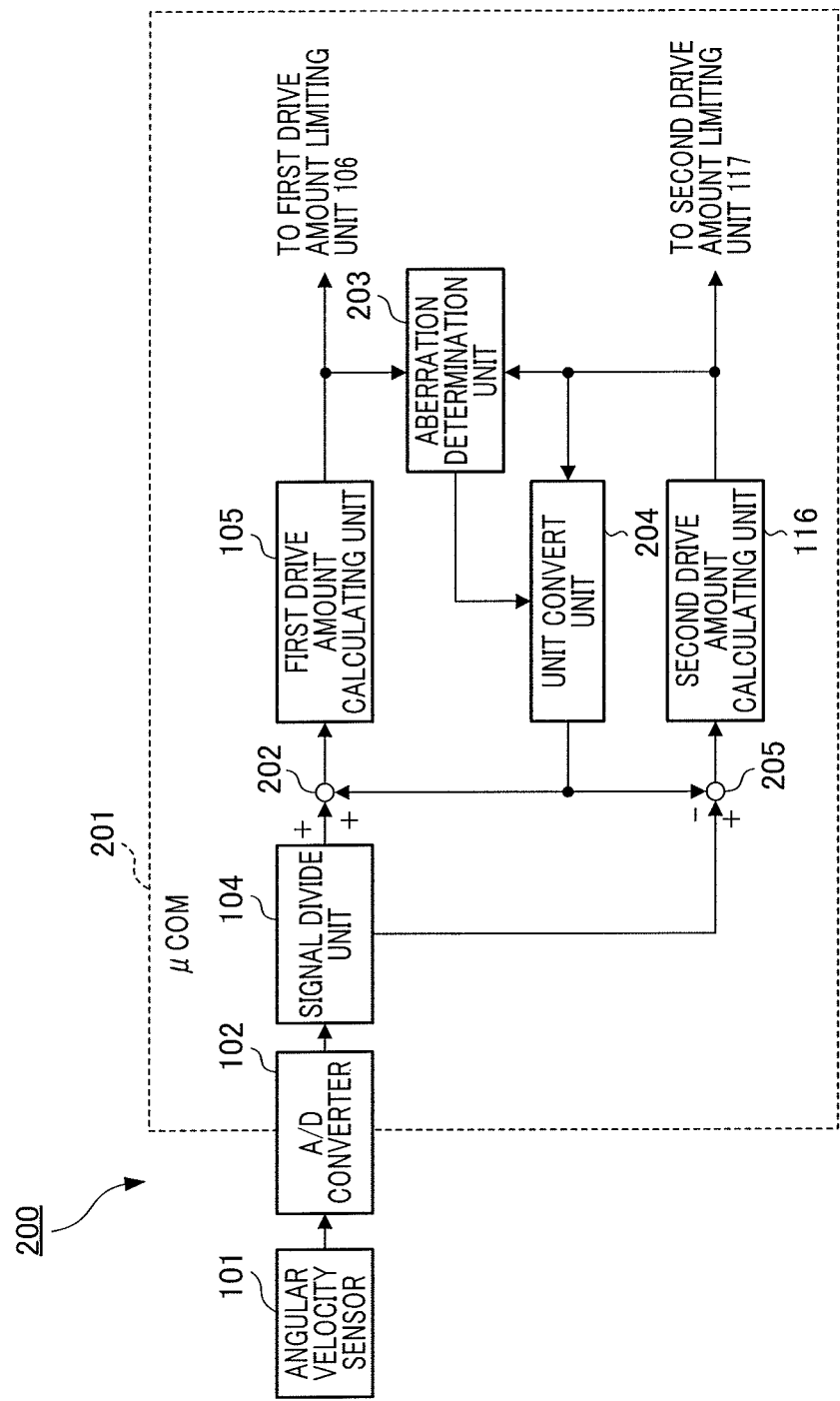
FIG. 4 is a block diagram illustrating an exemplary configuration of an image pickup apparatus according to a second embodiment of the present invention.

Next, a description will be given of a second embodiment of the present invention. FIG. 4 is a block diagram illustrating a configuration of a principal part of the image pickup apparatus 200 according to the present embodiment. Note that the already used reference numerals are used for the same components as those in the first embodiment, and thus, a detailed description thereof will be omitted in the present embodiment. A description will be given of the differences from the first embodiment. Likewise, a description will be omitted in the same manner in other embodiments to be described below.

The present embodiment is different from the first embodiment at the following point.

limiting the lens drive by the processing for applying an offset to the angular velocity data output by the signal divide unit 104 in the present embodiment, while performing the limit processing to the lens drive amount based on the result of the determination for the aberration determination unit 127 in the first embodiment, adding the limited part against the second angular velocity data to the first angular velocity data to allow the first angular velocity data input to the first drive amount calculating unit 105 and the second angular velocity data input to the second drive amount calculating unit 116 to be complementary signals each other.

Output of a unit convert unit 204 is transmitted to an adder 202 and a subtracter 205, and the adder 202 adds the output of the unit convert unit 204 to the first angular velocity data output from the signal dividing unit 104. On the other hand, the subtracter 205 subtracts the output of the unit convert unit 204 from the second angular velocity data output from the signal dividing unit 104.

Figure 5B:
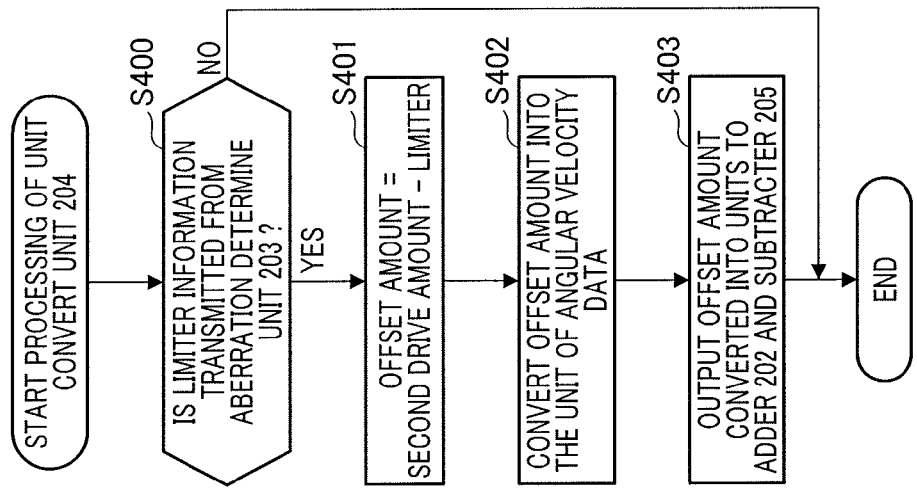
FIGS. 5A and 5B are flow charts illustrating a processing of an aberration determining unit 203 (A) and a processing of a unit conversion unit (B) according to a second embodiment of the present invention.
Figure 5A:
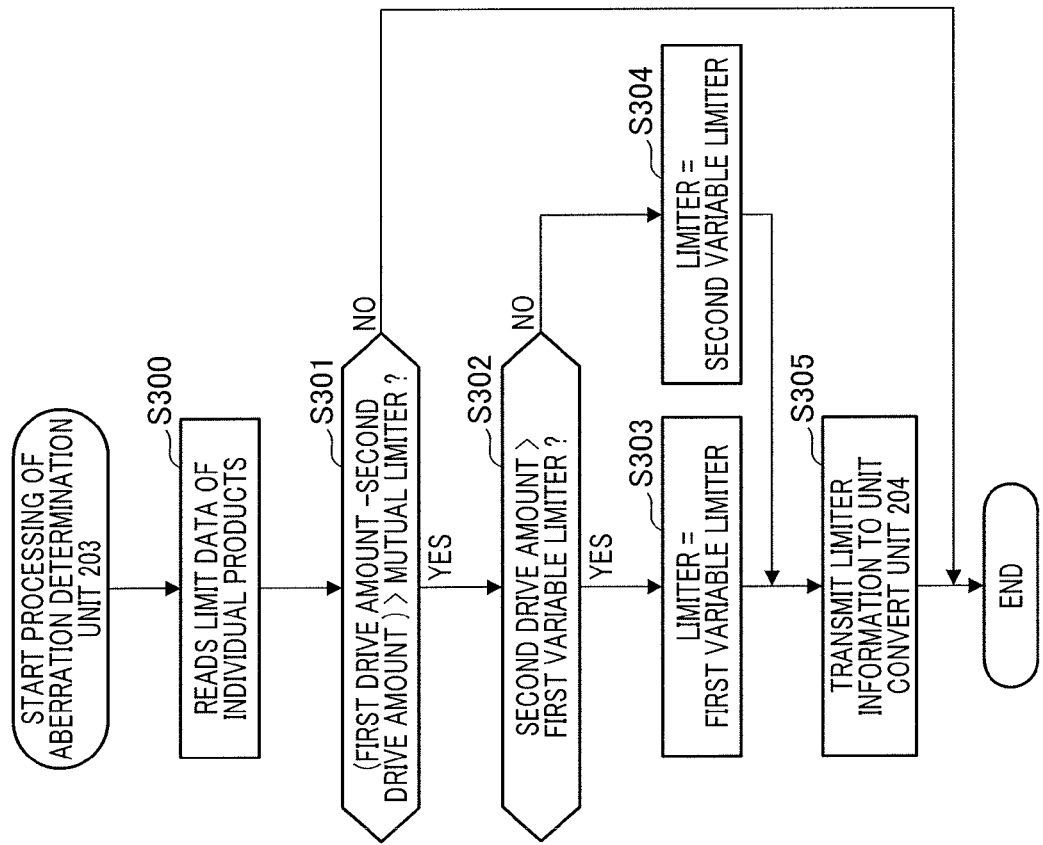

Hereinafter, a description will be given of a processing of an aberration determination unit 203 and the unit convert unit 204 referring to a flowchart of FIG. 5, and FIG. 6. In general, the content of processing for the aberration determination unit 203 is similar to that of the aberration determination unit 127. FIG. 5A illustrates an exemplary processing performed by the aberration determination unit 203 and FIG. 5B illustrates an exemplary processing performed by the unit convert unit 204.

Firstly, in S300 of FIG. 5A, the aberration determination unit 127 reads the limit data of the individual product recorded in the memory (not shown) previously. Note that the limiter is same as that in the first embodiment and then, a description of that will be omitted.

S301 is a processing of a comparison determination between the difference of the first drive amount and the second drive amount, and the mutual limiter. If the difference is larger than the mutual limiter, the processing proceeds to S302, and if the difference is less than the mutual limiter, the processing is stopped. S302 is a processing of a comparison determination between the second drive amount and the first variable limiter. If the second drive amount is larger than the first variable limiter, the processing proceeds to S303. If the second drive amount is less than the first variable limiter, it proceeds to S304. In S303, the value of the first variable limiter is assigned to the limiter. And in S304, that of the second variable limiter is assigned to the limiter. It will be appreciated that "the first variable limiter>the second variable limiter" is practical.

After S303 or S304, the processing proceeds to S305 and the aberration determination unit 203 transmits the determined limiter to the unit convert unit 204 to stop the processing.

Next, the unit convert unit 204 determines whether or not the limiter information is transmitted from the aberration determination unit 203 in S400, as shown in FIG. 5B. If the limiter information is transmitted, the unit convert unit 204 obtains the limiter information to transfer the processing to S401. However, if the limiter information is not transmitted, the processing is stopped.

In S401, the part that performs the limit processing on the second drive amount is calculated as an offset amount. In other words, the offset amount is calculated as the value for subtracting the limiter value set in the aberration determination unit 203 from the second drive amount. In S402, the offset amount calculated in S401 is converted into angular velocity data units. More specifically, in this processing, the offset amount is differentiated to convert the angle into the angular velocity units. In S403, the unit converting unit 204 outputs the unit-converted offset amount calculated in S402 to the adder 202 and the subtracter 205 respectively to stop the processing.

FIG. 6 illustrates a drive amount and an angular velocity data when the processing described above is performed. FIG. 6A illustrates a time variation of the first drive amount, the second drive amount, or the difference of the first drive amount and the second drive amount used in the determination by the aberration determination unit 203. FIG. 6B illustrates a time variation of the first angular velocity data and the second angular velocity data after the offset. The abscissa shows a time, and the ordinate shows the amplitude of each signal.

If the difference between the first drive amount and the second drive amount exceeds the level of the mutual limiter when the time is T in FIG. 6A, the offset for converting the difference between second drive amount and the first variable limiter into angular velocity units is added to the first angular velocity data as shown in FIG. 6B. Also, the offset for converting the difference between the second drive amount and the first variable limiter into angular velocity units is subtracted from the second angular velocity data. The second drive amount can be calculated from the second angular velocity data subtracting the offset to calculate the value less than the first variable limiter. Also, the offset part subtracted from the second angular velocity data can be added to the first angular velocity data to obtain signals complementary to each other to prevent the reduction in the performance of the image shake correction.

The processing described above is applied if the first correction lens and the second correction lens are moved so as to be spaced away each other to cause the optical performance of the eccentric aberration for the imaging optical system 132 to increase. In contrast, if the movement direction of the first correction lens is same as that of the second correction lens to cause the optical performance of the eccentric aberration of the imaging optical system 132 to increase, the following processing is performed. The processing equivalent to S301 in FIG. 5B determines whether the sum of the first drive amount and the second drive amount is less than the mutual limiter in order to control the positional sum of the first correction lens and the second correction lens so as to be equal to or more than the predetermined value. If the sum of the first drive amount and the second drive amount is less than the mutual limiter, the limiter is set by the processing equivalent to that after S302 such that the sum of the first drive amount and the second drive amount is less than the predetermined value based on the result of the determination.

Also, the primary image shake correction is performed by the movement of the first correction lens, and the second correction lens is moved supplementarily as close to the center of the drive as possible according to an embodiment of the present invention, which is the basic processing in the present embodiment. This is variable control when one correction lens is controlled to place it close to the center of the drive to cause the eccentric aberration to be less even if the distance between the two correction lenses is same with regard to the optical performance of the imaging optical system 132. A description will be given of the opposite case as following.

In the above example, the limiter to the second drive amount is provided in order to control the two correction lenses so as not to be placed close to the center of the drive. However, in this example, the limiter is provided to the larger of the two drive amounts. More specifically, a description will be given of the case in which the drive amount of the second correction lens is larger than that of the first correction lens. In this case, it is understood that the difference between the second drive amount and the limiter is the offset amount, and the offset amount is converted to angular velocity data units and subtracted from the second angular velocity data. Also, the offset amount converted to angular velocity data units is added to the first angular velocity data. Thereby, the first correction lens driven close to the center of the drive with the small drive amount is moved maximally to drive control both correction lenses so as to be out of the center of the drive.

In an embodiment of the present invention, the drive amount of one correction lens can be limited to compensate the control by adding the drive amount of the other correction lens to the limited amount in order to suppress much reduction in the performance of the image shake correction compared to the case that the drive amount is simply controlled.

Third Embodiment

Next, a description will be given of a third embodiment.

Figure 7:
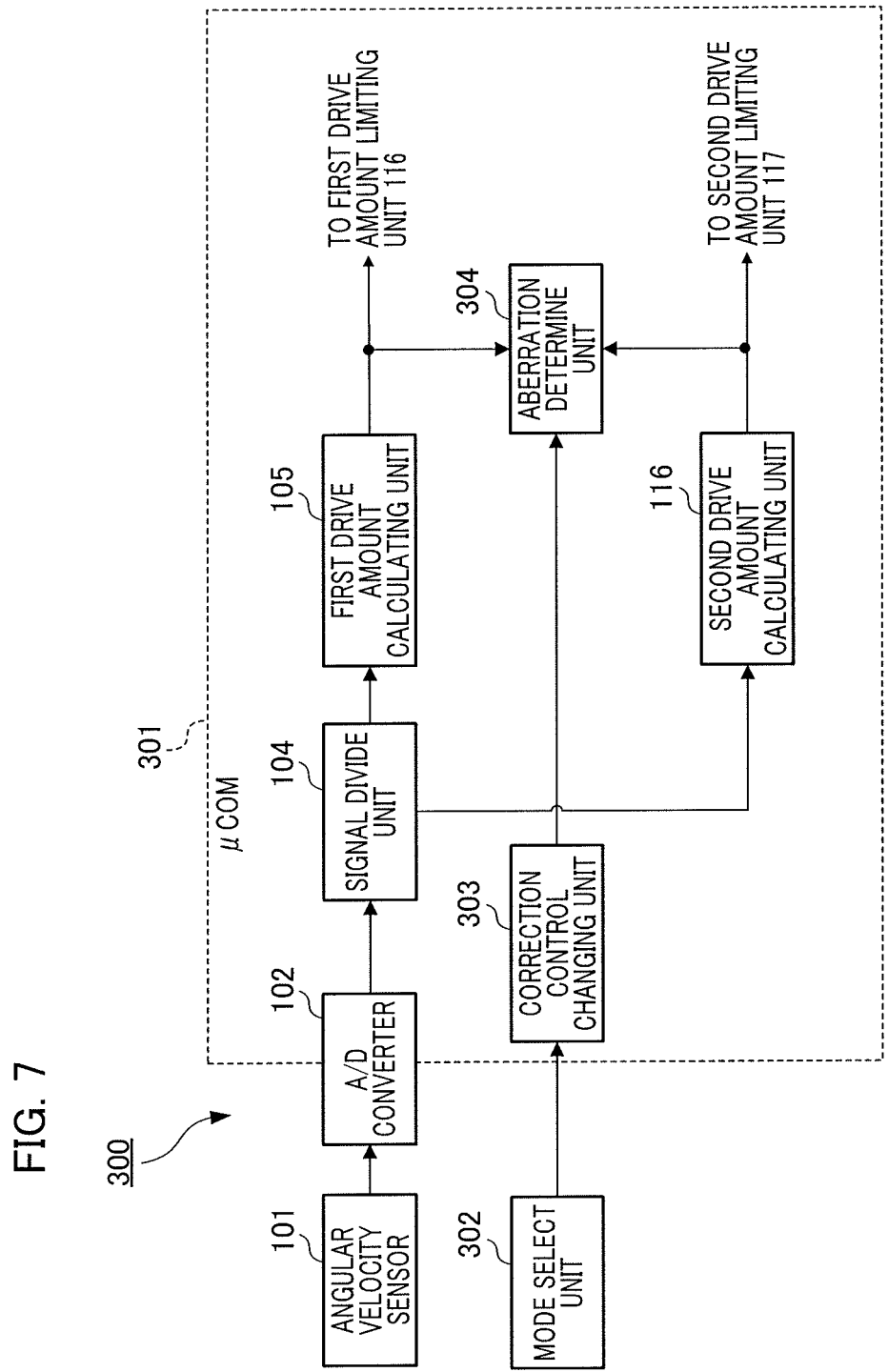
FIG. 7 is a block diagram illustrating an exemplary configuration of an image pickup apparatus according to a third embodiment of the present invention.

FIG. 7 is a block diagram illustrating a configuration of an principal part of an image pickup apparatus 300 according to an embodiment of the present invention. The image pickup apparatus 300 comprises a priority mode for performance of the image shake correction and an image quality priority mode as a shooting mode. The drive limitation of the correction lens based on the determination of the aberration is set not to be performed in the priority mode for performance of the image shake correction. Thereby, the priority mode for performance of the image shake correction can correct the image shake in a wider correction range rather than the image quality priority mode for performing the limitation by the aberration.

A mode select unit 302 is used in performing the operation for selecting the shooting mode by a photographer. The mode can be selected by the mode select unit 302 as follows:

a first mode for maximizing the correction range of the image correction to prioritize the performance of the image shake correction (priority mode for performance of the image shake correction)

a second mode for putting a limitation on the drive amount in correcting the image shake to suppress the reduction in the appearance quality of the image by the eccentric aberration (image quality priority mode).

In addition to the two modes, the mode for limiting a drive to a part of a plurality of correcting lenses or the like may be provided.

Examples of the mode selecting processing in the mode select unit 302 include a way to select the mode by the menu operation on a touch panel and by using the mode conversion switch or the like. The mode select unit 302 notifies a correction control changing unit 303 inside a control unit 301 about the information about the selected mode. The correction control changing unit 303 determines whether or not the drive control of the correction lens based on the eccentric aberration is performed on the basis of the notified mode from the mode select unit 302. The correction control changing unit 303 outputs the signal which indicates the validity or the invalidity of the drive control of the correction lens to an aberration determination unit 304. The aberration determination unit 304 changes the way of the drive control based on the signal from the correction control changing unit 303. More specifically, the calculation of the limiter based on the first drive amount and the second drive amount is not performed if the aberration determination unit 304 receives a signal which makes the drive control invalid. Also, the aberration determination unit does not transmit the limiter information to the second drive amount limiting unit 117 if it is the configuration of the first embodiment, and also, it does not transmit the limiter information to the unit convert unit 204 if it is the configuration of the second embodiment. In contrast, if the drive control is validated, the limiter information is transmitted as described in the first and second embodiments.

In an embodiment of the present invention, the photographer can select the first mode for prioritizing the performance of the image shake correction and the second mode for suppressing the aberration to prioritize the image quality. By converting the modes, whether or not the drive control of the correction lens is performed depends on the selected mode, and the photographer can perform the desired shooting to improve the convenience.

While the present invention has described based on the preferred embodiments, however, it is to be understood that the invention is not limited in the specific embodiment, and also includes a variety of embodiments without departing from the scope of the invention. Suitably, a part of the embodiments described above may be combined. While the description is given of the exemplary configuration comprising the first correction optical system and the second correction optical system, the configuration form for correcting the image shake by using three or more than correcting optical systems is within the technical range of the invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-218231, filed Oct. 21, 2013, which is hereby incorporated by reference herein in its entirety.

What is claimed is:

1. An image shake correcting device for correcting an image shake by using a plurality of optical correcting units configured to be components of an imaging optical system comprising:
   a signal dividing unit configured to divide the shake detection signal by a shake detecting unit into a plurality of signals;
   a calculating unit configured to calculate respectively a drive amount of the plurality of the optical correcting units from the plurality of the signals divided by the signal dividing unit; and
   a limiting unit configured to limit the drive amounts of the plurality of the optical correcting units,
   wherein when the plurality of the optical correcting units are driven to perform the image shake correction, the limiting unit limits any drive of the plurality of the optical correcting units, and
   wherein the limiting unit changes limiting conditions in the case in which the movement directions, when performing the image shake correction, of a first optical correcting unit and a second optical correcting unit that are included in a plurality of optical correction units are the same and in the case in which they are different.

2. The image shake correcting device according to claim 1,
   wherein the first correction optical unit and the second correction optical unit respectively comprise an optical element that may be moved in a direction perpendicular to an optical axis of the imaging optical system,
   wherein the signal dividing unit divides the shake detection signal output by the shake detecting unit and outputs a first signal and a second signal,
   wherein the calculating unit obtains the first signal and calculates a first drive amount, and obtains the second signal and calculates a second drive amount,
   wherein the limiting unit limits t drive amount or the second drive amount.

3. The image shake correcting device according to claim 2,
   wherein the first correction optical unit is driven according to the first drive amount and the second correction optical unit is driven according to the second drive amount,
   wherein when the first correction optical unit and the second correction optical unit are driven to perform the image shake correction, the limiting unit limits the first drive amount or the second drive amount and controls to reduce eccentric aberration of the imaging optical system to be less than the threshold.

4. The image shake correcting device according to claim 2,
   wherein the limiting unit limits the first drive amount or the second drive amount and controls a difference between the first drive amount and the second drive amount to be less than a first threshold, if eccentric aberration of the imaging optical system increases when the movement direction of the first correction optical unit is different from that of the second correction optical unit with respect to optical performance of the imaging optical system.

5. The image shake correcting device according to claim 2,
   wherein the limiting unit limits the first drive amount or the second the drive amount and controls the sum of the first drive amount and the second drive amount to be equal to or more than a second threshold, if eccentric aberration of the imaging optical system increases when the movement direction of the first correction optical unit is same as that of the second correction optical unit with respect to optical performance of the imaging optical system.

6. The image shake correcting device according to claim 2,
   wherein the limiting unit limits the first drive amount or the second drive amount by a processing for applying an offset to the first signal or the second signal.

7. The image shake correcting device according to claim 6, comprising:
   a converting unit configured to subtract a limit value from the second drive amount to convert the calculated offset into units;
   a first drive amount calculating unit configured to obtain the first signal and the output the converting unit and to calculate the first drive amount; and
   a second drive amount calculating unit configured to obtain the second signal and the output of the converting unit and to calculate the second drive amount.

8. The image shake correcting device according to claim 7, comprising:
   an adding unit configured to add the output of the converting unit to the first signal; and
   a subtracting unit configured to subtract the output of the converting unit from the second signal,
   wherein the first drive amount calculating unit calculates the first drive amount from the output of the adding unit and the second drive t calculating unit calculates the second drive amount from the output of the subtracting unit, if the limiting unit limits the drive of the second correction optical unit.

9. The image shake correcting device according to claim 1, comprising:
   a mode selecting unit configured to select a plurality of modes,
   wherein the limiting unit does not limit the drive of the optical correcting unit if a first mode is selected by the mode selecting unit, and limits the drive of the optical correcting unit if a second mode is selected by the mode selecting unit.

10. A lens barrel comprising:
the image shake correcting device according to claim 1.

11. An optical apparatus comprising:
the image shake correcting device according to claim 1.

12. An age pickup apparatus comprising:
the lens barrel according to claim 10.

13. A control method performed by an image shake correcting device for correcting an image shake by using a plurality of optical correcting units configured to be components of an imaging optical system, the method comprising:
   dividing the shake detection signal by a shake detecting unit into a plurality of signals by a signal dividing unit;

calculating drive amounts of the plurality of the optical correcting units respectively by a calculating unit from the plurality of the signals divided by the signal dividing unit; and limiting the drive amounts of the plurality of the optical correcting units by a limiting unit, wherein when the plurality of the optical correcting units are driven to perform the image shake correction, the limiting unit limits any drive of the plurality of the optical correcting units, and wherein the limiting unit changes the limiting condition in the case in which the movement directions, when performing the image shake correction, of a first optical correcting unit and a second optical correcting unit that are included in a plurality of optical correction units the same and in the case in which they are different.

14. The image shake correcting device according to claim 1, wherein the limiting, unit limits any drive of the plurality of the optical correcting units if eccentric aberration of the imaging optical system equal to or more than a threshold.

* * * * *